April 8, 1947. H. ETHERINGTON 2,418,803
CALCULATOR
Filed Nov. 19, 1945

Inventor
Harold Etherington
by K. S. Wyman
Attorney

Patented Apr. 8, 1947

2,418,803

UNITED STATES PATENT OFFICE 2,418,803

CALCULATOR

Harold Etherington, Wauwatosa, Wis., assignor to Allis-Chalmers Manufacturing Company, Milwaukee, Wis., a corporation of Delaware Application November 19, 1945, Serial No. 629,575

8 Claims. (Cl. 235—61)

This invention relates generally to the solution of problems through the use of logarithmic or other charts, and has for its object the provision of a simplified, inexpensive and durable apparatus for rapidly and accurately effecting mechanical calculations suitable for the solution of problems normally requiring the use of a plurality of multiple line charts.

More particularly, the present invention is directed to the provision of an improved, and preferably portable, calculator or computing device of the type wherein a plurality of elements, of which one or more may be made of transparent material, are combined and correlated, preferably in superposed relation, for relative movement with respect to each other in a manner which affords compactness and simplicity of operation and which permits shifting an indicator element from any one position to any other position by moving same along straight and/or curved lines constituting coordinates of a straight or curved line connecting points representing such one and other position. And in this connection, the elements employed may include a first element provided with a plurality of angularly displaced straight and/or curved index lines, and a second element, and if desired also a third element, each having a plurality of different straight and/or curved scales thereon with each scale bearing a definite predetermined functional relation with respect to at least one of the other scales.

In general, the relative arrangement and coaction of the various elements, scales and index lines is preferably such that said elements may be selectively shifted to move one of a pair of the index lines over the entire range of one of the scales and to move the other one of said pair of index lines over the entire range of another one of said scales while maintaining said one index line positioned to indicate a selected reading on said one scale. And if said third element is employed, to move one of the aforementioned or still another index line over the entire range of still another scale while maintaining said one index line positioned to indicate a computed reading on still another one of said scales.

Accordingly, the invention may be considered as consisting of scale and index-line bearing elements combined and correlated to provide a calculator or computing device of the character more fully set forth in the detailed description and appended claims, reference being had to the accompanying drawing illustrating an embodiment of the invention, in which:

Figure 2:
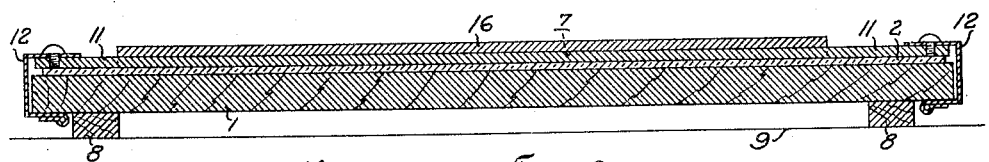
Fig. 2 is a section taken on line II—II of Fig. 1.
Figure 3:
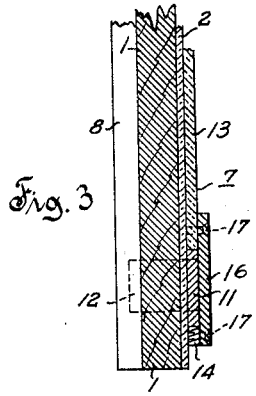
Fig. 3 is a section taken on line III—III of Fig. 1.

Referring to the drawing, it is seen that an illustrative embodiment of the present invention may include a base member or board 1 having a smooth top surface comprising sheet-like elements 2 and 3 fixedly mounted on board 1 with their opposed edges disposed in spaced parallel relation to form therebetween a generally diagonal groove 4 and a slide element 6 disposed in groove 4 for movement longitudinally thereof, and may include a transparent indicator element 7 superimposed on the smooth top surface of board 1 for movement thereover. The underside of board 1 is preferably provided with a pair of spaced rails or sills 8 adapted to support the board on a table top or other suitable structure 9, with the underside of the board spaced therefrom as indicated in Fig. 2. Elements 2 and 3 may be detachably secured to board 1 in any suitable manner, such as by screws 10, and if desired, may be transparent as indicated.

Figure 1:
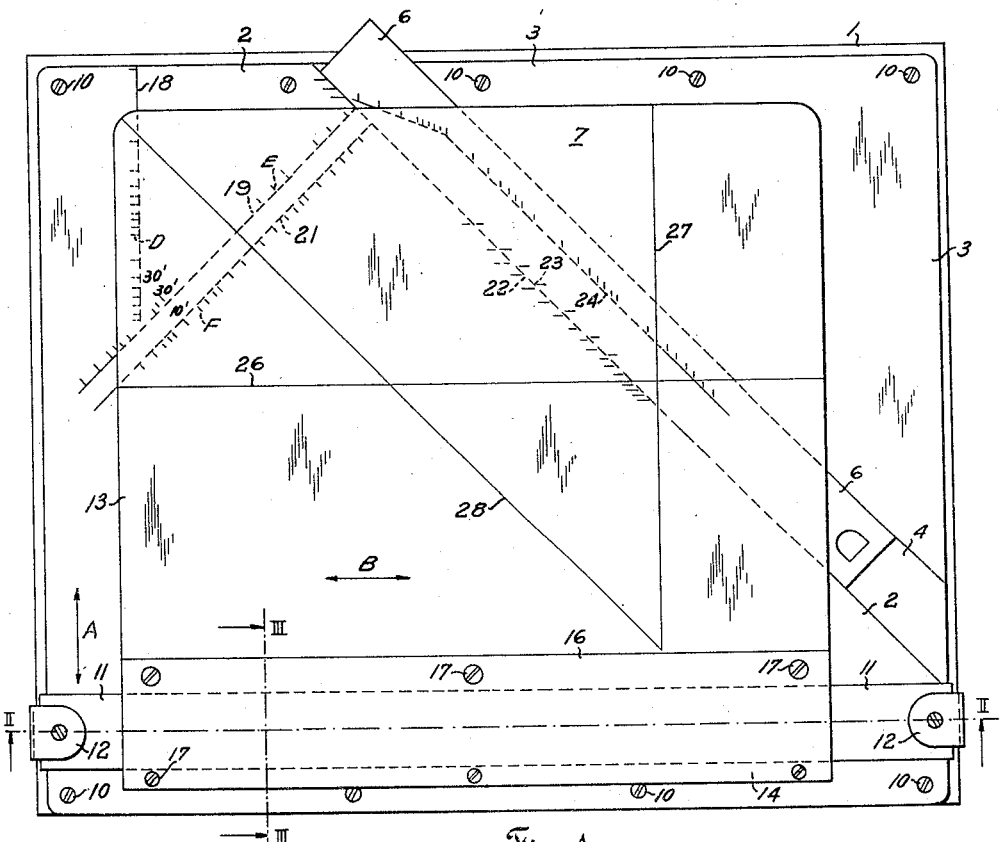
Fig. 1 is a plan view of the calculator.

Indicator 7 comprises a part 11 which extends entirely across board 1 and is mounted thereon by means of conventional end members 12 for sliding movement thereover with its longitudinal edges parallel to the top and bottom edges of the board as viewed in Fig. 1, a generally rectangular transparent sheet-like piece 13 disposed in edge abutting relation against the top longitudinal edge of part 11, a strip 14 abutting the lower or bottom longitudinal edge of part 11, and a cover strip 16 overlying strip 14, part 11 and the adjacent marginal edge portion of sheet-like piece 13. Cover strip 16 is preferably detachably secured to sheet-like piece 13 and to strip 14 in any suitable manner, such as by screws 17. And it should now be apparent that sheet-like piece 13 will move bodily with part 11 and may be moved longitudinally thereof as indicated by arrow B while part 11 is either being held stationary on board 1 or is being moved vertically thereover as indicated by arrow A.

Sheet-like piece 2 is provided with a vertical scale 18, with two parallel scales 19 and 21 disposed in acute angle forming relation with respect to the adjacent side edge of groove 4 and with respect to scale 18, and with a fourth scale 22 extending longitudinally of and parallel to the groove forming edge of piece 2. Slide element 6 is provided with two spaced scales 23 and 24 extending longitudinally thereof with the scale 23 disposed in adjacent parallel relation with respect to the scale 22 on piece 2. Indicator 7 is provided with a horizontal index line 26, with a vertical index line 27 and with a third index line 28 disposed in acute angle forming relation with respect to lines 26 and 27. And in this connection, it should be noted that the scales and index lines are so arranged and of such length that indicator 7 can be selectively shifted so as to move line 26 over the entire effective range of scales 18 and 22, and so as to move line 28 over the entire effective range of scales 19 and 21 while maintaining line 26 positioned to directly overlie a selected or computed value on scale 19. It should also be noted that slide 6 can be selectively shifted relative to scale bearing element 2 and relative to indicator 7 so as to in effect move index lines 26 and 27 over the entire effective range of scales 23 and 24.

In general, the apparatus thus far described may be considered as comprising two scale bearing elements (fixed sheet-like piece 2 and slide 6) positioned to provide a continuous plain surface and a third index line bearing element (indicator 7) superimposed on the plain surface presented by elements 2 and 6 and being movable thereover along lines constituting the coordinates of a line connecting any two points on such plain surface representing selected or computed initial and final positions of the indicator thereon. For example, if, with the indicator 7 positioned as shown in Fig. 1, it is determined by computation or otherwise that the initial position of indicator 7 is to be such that line 26 intersects point D on scale 18, parts 11 and 13 may be moved vertically as a unit until line 26 intersects point D and part 13 may then be moved horizontally relative to part 11 until line 28 intersects a selected point E on scale 19, whereupon parts 11 and 13 may again be moved vertically as a unit until line 28 intersects a selected point F on scale 21. And it should now be obvious that in moving indicator 7 from a position in which line 26 intersects point D on scale 18 to a position in which line 28 intersects point F on scale 21, as just described, any selected point on the indicator would be first moved horizontally and then vertically along lines constituting the rectangular coordinates of a straight line connecting the initial and final position of such point.

And in this connection, it should be noted that when line 28 intersects a computed point on scale 21, that is computed by shifting indicator 7 as described in the preceding paragraph, line 26 will then intersect scale 22, that slide 6 may then be shifted longitudinally of groove 4 until a selected point on scale 23 also lies directly beneath line 26, and that when slide 6 is thus positioned, line 27 will always intersect scale 24. Consequently, if it is assumed that the scales on fixed element 2 and on slide 6 are functionally related and suitably correlated with respect to each other and with respect to the index lines on element 7, it should then be obvious that slide 6 and indicator 7 may be selectively shifted relative to each other and relative to fixed element 2 so as to rapidly effect mechanical calculations suitable for the solution of problems involving a plurality of functionally related variables.

Obviously, the shape, nature, number and arrangement of the scales and of the index lines to be incorporated in a computing device embodying the present invention will necessarily vary considerably depending upon the character and number of the variables presented by the particular problem to be solved. And while in some instances it may be of advantage, insofar as compactness and simplicity of operation are concerned, to employ elements provided with curved index lines and scales and combine same for relative angular movement, it is generally preferable, when feasible, to employ elements provided with straight index lines and scales and combine same for relative straight line movement as herein shown and described for purposes of illustration.

A computing device of the general character hereinbefore mentioned is capable of affording many practical uses of which one such use involves a plurality of elements combined for relative movement and provided with scales and index lines suitably arranged and correlated, as illustrated by the drawing, so as to effect a mechanical solution of a known and commonly used formula, Q equals the square root of 2RS/CJ. In this formula, Q represents the most economical quantity or number of articles to be made at one set-up, R represents the contemplated annual usage of such articles, S represents set-up cost including labor, order preparation, etc., C represents manufacturing cost per unit, exclusive of set-up cost, and includes material, direct labor and burden, and J is a constant representing a carrying charge comprising such items as interest, storage, insurance, etc., ordinarily chargeable against articles kept in stock. However, the desired value of Q equals PR where P represents the theoretical ordering period in years shortened to take into account such factors as the written off depreciation of inventory stock, and R represents annual usage as above stated. And in order to effect a rapid mechanical calculation of the desired value of Q using elements combined for relative movement in the particular manner hereinbefore described, the normal ranges of the variables S, C, R and P are represented by the scales 18, 19, 21 and 22, respectively, on fixed element 2 whereas the normal ranges of the variables P' and Q, where P' represents recalibrated values of P, are represented by the scales 23 and 24, respectively, on movable element 6.

The index lines 26, 27 and 28 on movable element 7 are arranged for movement over the various scales in the manner hereinbefore generally described, and in this connection, the nature of the various scales and the manner in which they are arranged and/or located on elements 2 and 6 may be as follows: 18 is a vertical 62.5 mm. logarithmic scale, 19 and 21 are 44.21 mm. logarithmic scales disposed at an angle of 45° with respect to scale 18 and so located relative thereto that a straight line at right angles to scales 19 and 21 will pass through point 30' on scale 18, point 30' on scale 19 and point 10' on scale 21, 22 is a non-logarithmic scale of suitable length disposed at right angles with respect to scales 19 and 21, 23 is a 38.375 mm. logarithmic scale disposed in parallel relation with respect to scale 22, and 24 is a logarithmic scale and may be of any convenient slope or curve providing the projection of same on a horizontal line will be a 62.5 mm. logarithmic scale. In this connection P'-scale 23 is merely non-logarithmic P-scale 22 recalibrated to a logarithmic scale. With respect to rectangular element 7, 26 is a horizontal line of such length that it can be moved over the entire effective range of scales 18 and 22 by a vertical movement of element 7, 28 is a 45° line of the same slope as scale 22 and intersects line 26 at a point about 8 inches from the left side edge of element 7 as viewed in Fig. 1, and 27 is a vertical line intersecting line 26 at a point exactly 7<sup>25</sup>/<sub>64</sub>" to the right of the point of intersection of lines 26 and 28.

All that has to be done in order to determine the value of P conforming to computed or otherwise determined values of S, C and R is to move indicator 7 vertically until line 26 directly overlies the computed value of S on scale 18, then move the indicator horizontally until line 28 directly overlies the computed value of C on scale 19, and again move the indicator vertically until line 26 directly overlies the computed value of R on scale 21 and read the number on scale 22 directly beneath line 26. And all that remains to be done in order to determine the corresponding value of Q is to move slide 6 relative to indicator 7 until line 26 directly overlies a number on scale 23 identical to the number on scale 22 directly beneath such line and read the number on scale 24 directly beneath line 27.

As hereinbefore indicated, a computing device embodying the present invention may depart in several respects from that herein shown and described for purposes of illustration and particularly as to the configuration, number and relative movement of the combined elements and/or as to the shape, nature, number and arrangement of the scales and of the index lines on such elements. And it should therefore be understood that it is not intended to limit the invention to a computing device constructed and operated exactly as disclosed in detail herein, as various modifications within the scope of the appended claims and of the character hereinabove mentioned, may occur to persons skilled in the art.

It is claimed and desired to secure by Letters Patent:

1. A computing device comprising a pair of elements, including at least one transparent element, combined and correlated in superposed relation for relative movement along lines constituting the coordinates of any line connecting two points on one of the elements representing selected initial and final relative positions of the elements, a plurality of different scales on one of said elements with each scale bearing a definite predetermined functional relation with respect to at least one of the other scales, and a plurality of angularly displaced index lines on the other of said elements, said scales and index lines being so arranged and of such length that a selected relative movement of said elements will in effect successively move first one of a pair of index lines over the entire effective range of one of said scales, and then move the other of said pair of index lines over the entire effective range of another one of said scales.

2. A computing device comprising a pair of elements, including at least one transparent element, combined and correlated in superposed relation for relative movement along lines constituting the coordinates of any line connecting two points on one of the elements representing selected initial and final relative positions of the elements, a plurality of different scales on one of said elements with each scale bearing a definite predetermined functional relation with respect to at least one of the other scales, and a plurality of angularly displaced index lines on the other of said elements, said scales and index lines being so arranged and of such length that a selected relative movement of said elements will in effect position one of a pair of index lines to indicate a selected reading on one of said scales and will maintain said one index line positioned to indicate said selected reading while in effect moving the other of said pair of index lines over the entire effective range of another one of said scales.

3. A computing device comprising a pair of elements, including at least one transparent element, combined and correlated in superposed relation for relative movement along lines constituting the coordinates of any line connecting two points on one of the elements representing selected initial and final relative positions of the elements, a plurality of different scales on one of said elements with each scale bearing a definite predetermined functional relation with respect to at least one of the other scales, and a plurality of angularly displaced index lines on the other of said elements, said scales and index lines being so arranged and of such length that a selected movement of said elements will in effect successively move first one of a pair of index lines over the entire effective range of one of said scales and then move the other of said pair of index lines over the entire effective range of another one of said scale, and will in effect move said other index line over the entire effective range of said other scale while maintaining said one index line positioned to indicate a selected reading on said one scale.

4. A computing device comprising first and second elements combined and correlated in superposed relation for a relative movement of the first element along lines constituting the coordinates of any line connecting two points on the second element representing selected initial and final relative positions of the elements, said first element being transparent and having thereon a plurality of angularly displaced index lines, and a plurality of different scales on said second element with each scale bearing a definite predetermined functional relation with respect to at least one of the other scales, said scales and index lines being so arranged and of such length that said first element can be selectively shifted so as to first move one of a pair of index lines over the entire effective range of one of said scales and so as to then move the other of said pair of index lines over the entire effective range of another one of said scales while maintaining said one index line positioned to indicate a selected reading on said one scale.

5. A computing device comprising a plurality of elements combined and correlated for relative movement with respect to each other and including two elements positioned to provide a continuous plain surface and a third element disposed in superposed relation with respect to the plain surface presented by said two elements, said two elements when considered as a unit and said third element being relatively movable along lines constituting the coordinates of any line connecting two points on said plain surface representing selected initial and final relative positions of said third element, said two elements being relatively movable and each having a plurality of different scales thereon with each scale bearing a definite predetermined functional relation with respect to at least one of the other scales, and a plurality of angularly displaced index lines on said third element, said scales and index lines being so arranged and of such length that a selected relative shifting of said elements will in effect move one of a pair of said index lines over the entire effective range of a first scale, will in effect move the other of said pair of index lines over the entire effective range of a second scale while maintaining said one index line positioned to indicate a selected reading on said first scale, and will in effect move still another index line over the entire effective range of a third scale while maintaining said one index line positioned to indicate a computed reading on a fourth scale.

6. A computing device comprising a plurality of elements combined and correlated for relative movement with respect to each other and including two elements positioned to provide a continuous plain surface and a third element disposed in superposed relation with respect to the plain surface presented by said two elements, said third element being movable over said two elements along lines constituting the coordinates of a line connecting any two points on said plain surface representing selected initial and final positions of the third element thereon, said two elements being relatively movable and each having a plurality of different scales thereon with each scale bearing a definite predetermined functional relation with respect to at least one of the other scales, and a plurality of angularly displaced index lines on said third element, said scales and index lines being so arranged and of such length that said third element can be selectively shifted so as to move one of a pair of said index lines over the entire effective range of a first scale on one of said two elements and to move the other one of said pair of index lines over the entire effective range of second and third scales on said one element while maintaining said one index line positioned to indicate a selected reading on said one scale, and that the other one of said two elements can be selectively shifted relative to said one element and relative to said third element so as to in effect move still another index line on said third element over the entire effective range of a scale on said other element while maintaining said other index line positioned to indicate a computed reading on one of said second and third scales.

7. A computing device comprising a pair of elements including at least one transparent element, combined and correlated in superposed relation for relative movement along lines constituting the coordinates of any line connecting two points on one of the elements representing selected initial and final relative positions of the other element, a plurality of different scales on one of said elements with each scale bearing a definite predetermined functional relation with respect to at least one of the other scales, and a plurality of angularly displaced index lines on the other of said elements, said scales and index lines being so arranged and of such length that a selected relative shifting of the elements will in effect successively move first one of a pair of index lines over the entire effective range of one of said scales and then the other of said pair of index lines over the entire effective range of second and third scales, and will then move said other index line over the entire range of one of said second and third scales while maintaining said one index line positioned to indicate a selected reading on said one scale.

8. A computing device comprising a plurality of elements combined and correlated for relative movement with respect to each other and including two elements positioned to provide a continuous plain surface and a third element disposed in superposed relation with respect to the plain surface presented by said two elements, said third element being movable over said two elements along lines constituting the coordinates of a line connecting any two points on said plain surface representing selected initial and final positions of the third element thereon, said two elements being relatively movable and each having a plurality of different scales thereon with each scale bearing a definite predetermined functional relation with respect to at least one of the other scales, and a plurality of angularly displaced index lines on said third element, said scales and index lines being so arranged and of such length that said third element can be selectively shifted so as to move a pair of said index lines over the entire effective range of several of the scales on one of said two elements and to move the other one of said pair of index lines over the entire effective range of one of said several scales while maintaining said one index line positioned to indicate a selected reading on another one of said several scales, and that the other one of said two elements can be selectively shifted relative to said one element and relative to said third element so as to in effect move still another index line on said third element over the entire range of a scale on said other element to indicate a computed reading under said one index line.

HAROLD ETHERINGTON.